(12) United States Patent
Aoshima

(10) Patent No.: US 6,858,959 B2
(45) Date of Patent: Feb. 22, 2005

(54) MOTOR AND LIGHT AMOUNT ADJUSTING APPARATUS

(75) Inventor: Chikara Aoshima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 182 days.

(21) Appl. No.: 10/252,375

(22) Filed: Sep. 24, 2002

(65) Prior Publication Data

US 2003/0062788 A1 Apr. 3, 2003

(30) Foreign Application Priority Data

Sep. 28, 2001 (JP) ......................................... 2001-299523

(51) Int. Cl.⁷ ............................................. H02K 21/12
(52) U.S. Cl. .................. 310/156.32; 310/266; 310/268
(58) Field of Search ............................. 310/156.32, 82, 310/237, 266, 268; 396/463, 493

(56) References Cited

U.S. PATENT DOCUMENTS

| | | | | | |
|---|---|---|---|---|---|
| 3,700,942 A | * | 10/1972 | Alth | ............................ | 310/164 |
| 4,207,483 A | * | 6/1980 | Baer | ........................ | 310/49 R |
| 4,382,668 A | * | 5/1983 | Umehara et al. | ........... | 396/336 |
| 4,387,312 A | * | 6/1983 | Oudet | ...................... | 310/49 R |
| 4,772,904 A | * | 9/1988 | Otsuka et al. | .............. | 396/508 |
| 4,779,114 A | * | 10/1988 | Kobayashi | .................. | 396/132 |
| 5,559,569 A | * | 9/1996 | Akimoto et al. | ............ | 396/133 |
| 5,831,356 A | | 11/1998 | Aoshima | | |
| 6,064,828 A | | 5/2000 | Ueda et al. | | |

FOREIGN PATENT DOCUMENTS

| | | | | |
|---|---|---|---|---|
| EP | 042884 A1 | * | 1/1982 | |
| FR | 2570228 A1 | * | 3/1986 | .......... H02K/37/14 |
| JP | 01315248 A | * | 12/1989 | .......... H02K/37/12 |
| JP | 7-213041 | | 8/1995 | |
| JP | 2000-50601 | | 2/2000 | |
| JP | 2000092810 A | * | 3/2000 | |

* cited by examiner

Primary Examiner—Joseph Waks
(74) Attorney, Agent, or Firm—Fitzpatrick, Cella, Harper & Scinto (57) ABSTRACT

A motor having a short axial length and a large torque, including a disk-shaped rotor having at least one plane magnetized in a plurality of different poles in a rotational direction thereof, a coil arranged such that an inner circumferential surface of the coil faces an outer circumferential surface of the rotor, or an outer circumferential surface of the coil faces an inner circumferential surface of the rotor, a first magnetic pole portion that faces a plane of the rotor, is formed with teeth extending in a radial direction of the rotor, and can be excited by the coil, and a second magnetic pole portion that is provided on a side of the rotor opposite the first magnetic pole portion such that the first and second magnetic pole portions sandwich the rotor, and can be excited by the coil.

15 Claims, 9 Drawing Sheets

MOTOR AND LIGHT AMOUNT ADJUSTING APPARATUS

BACKGROUND OF THE INVENTION

1. Field of the Invention

The present invention relates to a motor in which rotor length in the direction of a rotation axis is shortened, and a light amount adjusting apparatus in which this motor is used as a driving force for a blade member such as a shutter or an f-stop number adjusting mechanism.

2. Related Background Art

In general, operation concerning the exposure of a digital camera is performed as follows.

First of all, a main power source is turned on before taking a picture, a shutter blade is held in an open position when an image pickup element becomes a working condition, and the luminous flux of an objective field reaches the image pickup element. The image pickup element that receives the luminous flux of the objective field performs photoelectric conversion and repeats the accumulation of electric charges, and the emission and transmission of the accumulate charges. Then, an image monitor displays an image of the objective field on the basis of the transmitted signal. When a release button is pushed, an f-stop number and exposure time are determined according to an output of the image pickup element at that time, and the aperture blade is driven according to the determined f-stop number. Next, the image pickup element discharging the accumulated charges is made to start the accumulation of electric charges, and at the same time, an exposure time controlling circuit is started while making an accumulation start signal a trigger signal. When predetermined exposure time elapses, the shutter blade is moved to and held in a closed position for the luminous flux of the objective field to reach the image pickup element. Thereafter, the accumulated electric charges are transferred, and image information is recorded in a recording medium by an image recording apparatus. The reason why exposure to the image pickup element is prevented during transferring the electric charges is to prevent the electric charges from changing during transferring the electric charges by extra light.

A small motor is used as a drive unit that operates these shutter blade and aperture blade. There is a brushless type motor as a suitable form for a small motor, and further, there is a stepper motor, shown in FIG. 9, as the brushless type motor.

Figure 9:
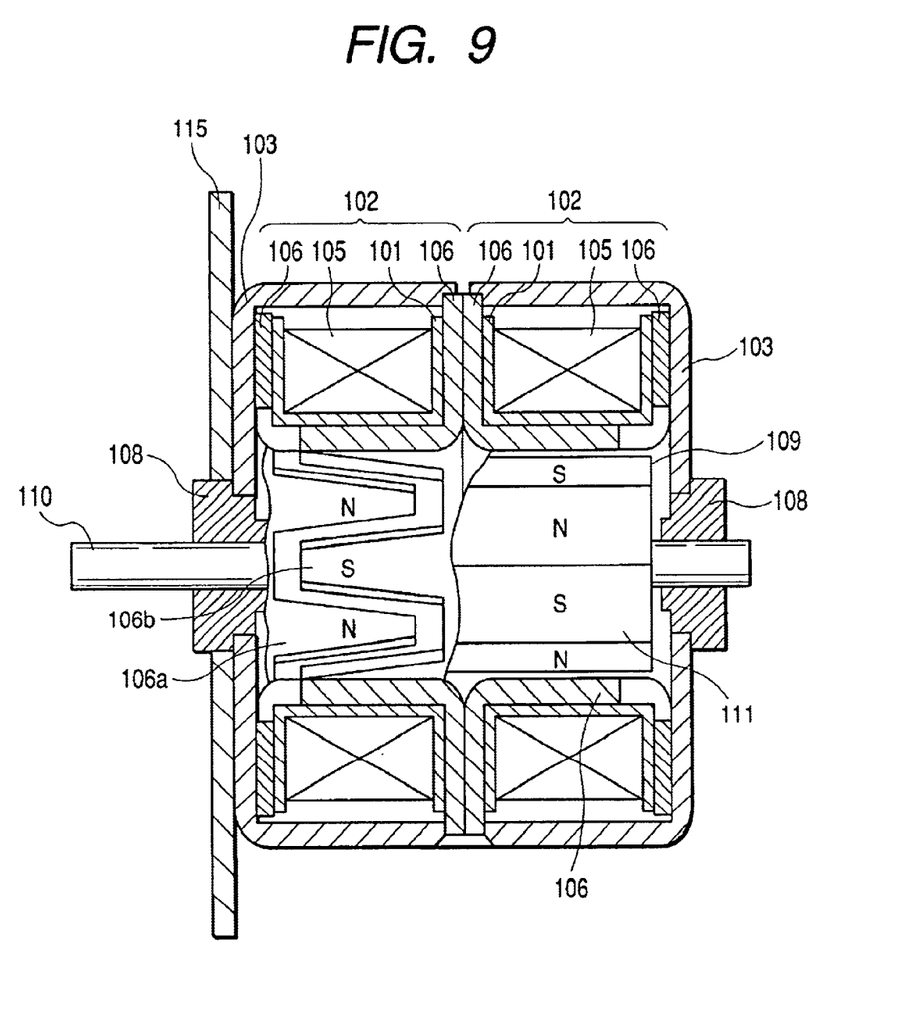
FIG. 9 is a sectional view of a conventional stepper motor.

This is constituted by coaxially winding a coil 105 around a bobbin 101, and the bobbin 101 is axially held and fixed with two stator yokes 106. In addition, stator teeth 106a and 106b are staggered in an inner circumferential face of the bobbin 101 in the stator yoke 106. In a housing 103, a stator 102 is constituted by fixing the stator yoke 106 that is integrated with the stator teeth 106a or 106b. In one of two housings 103, a flange 115 and a bearing 108 are fixed, and in another housing 103, another bearing 108 is fixed. A rotor 109 consists of rotor shaft 110 and a rotor magnet 111 fixed to this, and there is a gap between the rotor magnet 111 and stator yoke 106a of the stator 102. Then, the rotor shaft 110 is supported rotatably by two bearings 108.

However, since such a type of motor that is shown in FIG. 9 is provided while centering on an output shaft, the motor does not have hollow structure. Therefore, when this motor is used as a driving force that drives an aperture blade, a shutter, a lens, or the like, this motor is arranged so that this motor may become parallel to an optical axis outside the lens in a body tube of a camera. Hence, the radius of the body tube becomes a value obtained by adding the diameter of the motor to the radius of the lens and the radius of an aperture opening.

Therefore, this applicant proposed a motor that was lessened in the radial direction of the rotor in U.S. Pat. No. 5,831,356. Since this motor was miniaturized in the radial direction of the rotor, it was possible to make the diameter of the body tube small enough even if the motor was arranged in the outer circumferential face of the lens.

On the other hand, another motor is proposed, the motor that has a hollow shape and is constituted so that the luminous flux of an objective field can pass the hollow portion. Since the luminous flux of the objective field passes a core of the motor, this is more suitable for the miniaturization in the radial of the body tube than the structure that the motor is arranged in parallel with the lens. Moreover, if motor length in the direction of a rotation axis of the rotor is shortened, it is possible to constitute the lens body tube very compactly.

In addition, motors with short total length in the rotation axis of the rotor are proposed in Japanese Patent Application Laid-Open No. 7-213041, Japanese Patent Application Laid-Open No. 2000-50601, and the like. Though the motors described in the above-mentioned two gazettes are not hollow, it will be possible to modify them into hollow motors by providing each ring rotor, making this rotor an output member, and providing a hole in a central portion of its housing.

Figure 10:
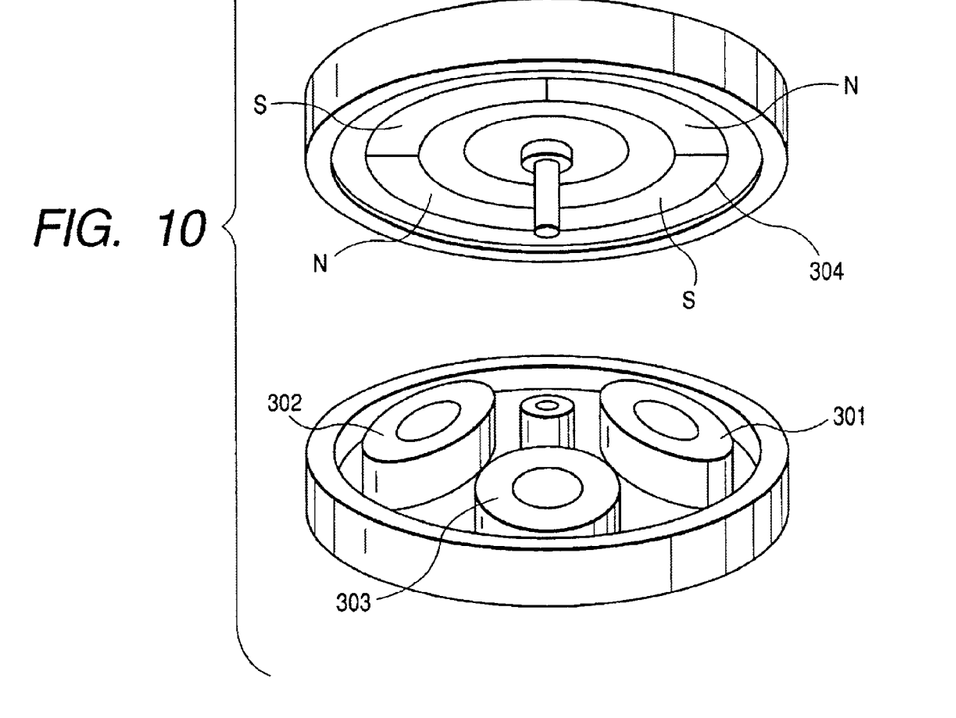
FIG. 10 is a perspective view showing an example of a conventional flat brushless motor.
Figure 11:
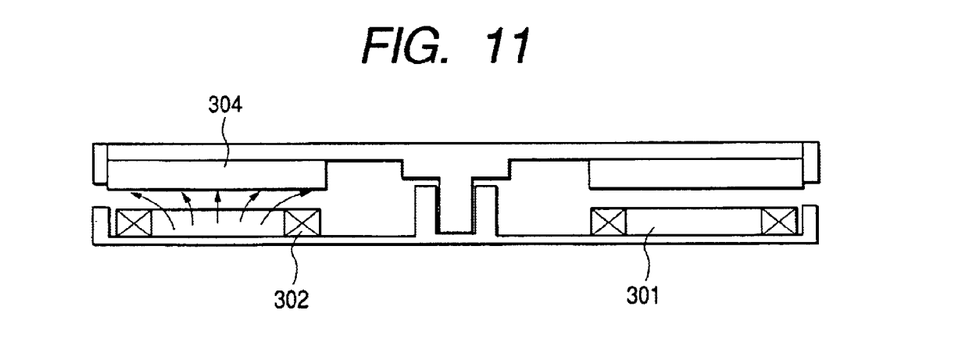
FIG. 11 is a sectional view of the motor in the direction of a rotation axis that is shown in FIG. 10.

The simplified structure of the motors described in the above-mentioned gazettes is shown in FIGS. 10 and 11. A motor having the simplified structure is constituted by a plurality of coils 301, 302, and 303, and a disc-like magnet 304, a coil has a thin coin shape as shown in figure, and a pivot of the coil is arranged in parallel to a magnet shaft. The disc magnet is magnetized in the axial direction of the disk, and is arranged so that a magnetized side of the magnet may face the coil. The magnet 304 is rotated by energizing a plurality of coils 301 to 303 sequentially and generating magnetic flux. Since the coils 301 to 303 and magnet 304 are formed thinly together, it is possible to lessen the size in the direction of the rotation axis of the motor.

Nevertheless, in the motors proposed in Japanese Patent Application Laid-Open No. 7-213041, Japanese Patent Application Laid-Open No. 2000-50601, and the like, as shown in FIG. 11, the magnetic flux generated in each coil did not necessarily effectively go to the magnet 304, but some magnetic flux went in the direction out of the magnet. Therefore, torque was not so large for the size of the entire motor.

In addition, since the coils 301 to 303, and the magnet 304 are abreast arranged in the direction of the rotation axis of the motor, the length of the motor in the axial direction becomes the length obtained by adding the height of the coil to the height of the magnet at lowest. When this motor was used as an adjustment mechanism of the shutter blade or the aperture blade, the total length of the apparatus did not become so short, and hence, this motor was not so suitable for the structure that an image-taking lens is arranged near the aperture blade or the shutter blade. Therefore, in order to provide a motor where the total length in the direction of the rotation axis is further shortened and torque is improved, it is preferable to further improve the motor.

SUMMARY OF THE INVENTION

The present invention provides a motor comprising: a rotor that is formed into a hollow disk shape, and has at least one plane of the disk magnetized in a plurality of different poles in the rotational direction; a coil that is arranged in a position where its inner circumferential surface faces an outer circumferential surface of the rotor or, a position where its outer circumferential surface faces an inner circumferential surface of the rotor; a first magnetic pole portion that faces one plane of the rotor, is formed with teeth extending in the radial direction of rotor, and is excited by the coil; and a second magnetic pole portion that is provided in an opposite side of the first magnetic pole portion while sandwiching the rotor, and is excited by the coil.

According to this structure, it becomes possible to provide a motor whose total length in the direction of a rotation axis is shortened and which has large torque.

In addition, it is desirable that the first magnetic pole portion is formed in a plate-like shape extending in parallel to the faced side of the rotor.

Another aspect of the present invention provides a light amount adjusting apparatus comprising: a rotor that is formed into a hollow disk shape, and has at least one plane of the disk magnetized in a plurality of different poles in the rotational direction; a coil that is arranged in a position where its inner circumferential surface faces an outer circumferential surface of the rotor or, a position where its outer circumferential surface faces an inner circumferential surface of the rotor; a first magnetic pole portion that faces one plane of the rotor, is formed with teeth extending in the radial direction of the rotor, and is excited by the coil; a second magnetic pole portion that is provided in an opposite side of the first magnetic pole portion while sandwiching the rotor, and is excited by the coil; a base plate member that has an opening; and a blade member that moves on the opening while interlocking with the rotation of the rotor.

According to this structure, it is possible to provide the light amount adjusting apparatus that is equipped with a shutter, an f-stop number adjusting mechanism, etc., and is short in the axial direction.

In addition, it is desirable that the light amount adjusting apparatus further comprises a regulator that drives a lever member by the rotation of the rotor, and regulates the quantity of light that passes the opening of the base plate member by the opening or a filter portion that is provided in the lever member.

DESCRIPTION OF THE PREFERRED EMBODIMENTS

Hereafter, the present invention will be explained on the basis of drawn embodiments.

Figure 1:
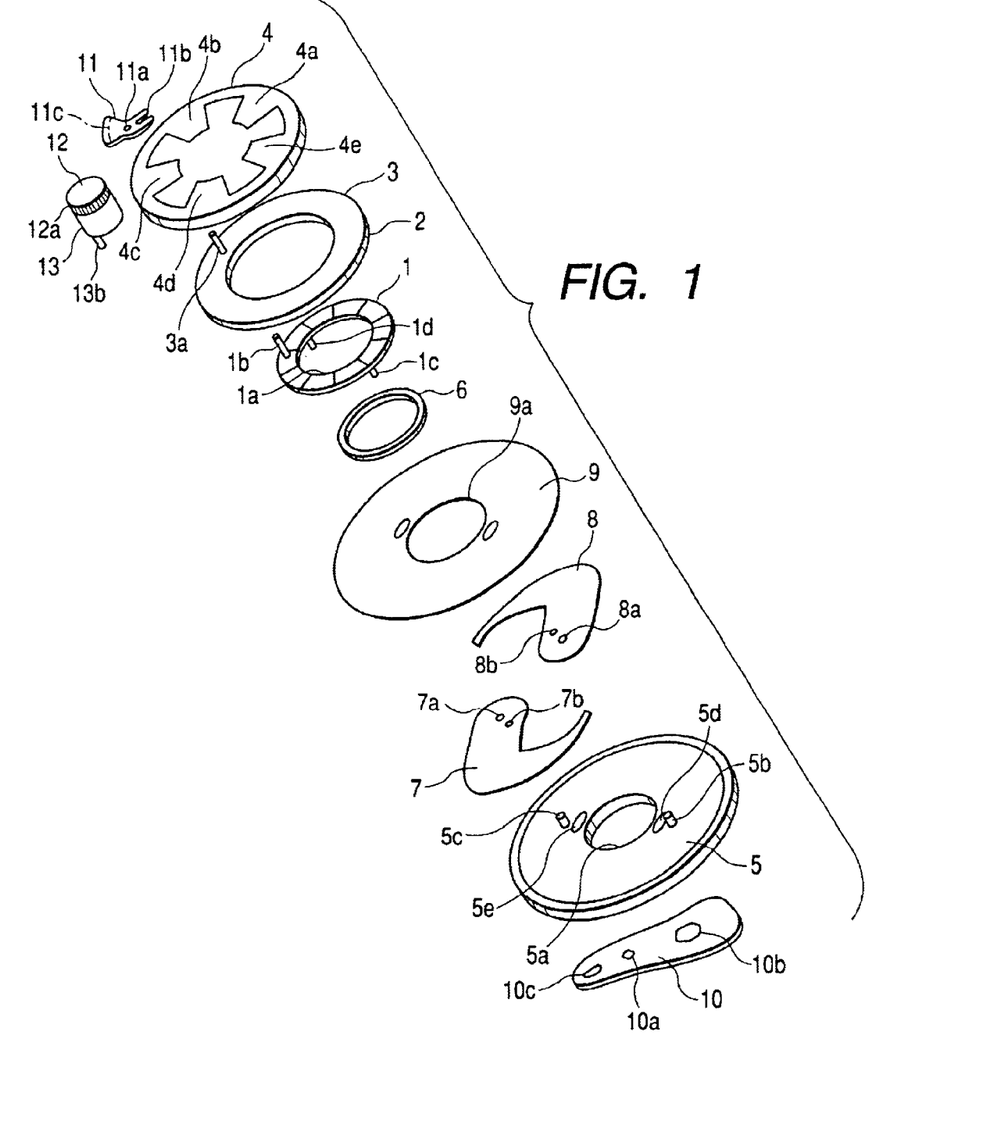
FIG. 1 is an exploded perspective view of a shutter drive unit in an embodiment of the present invention.
Figure 2:
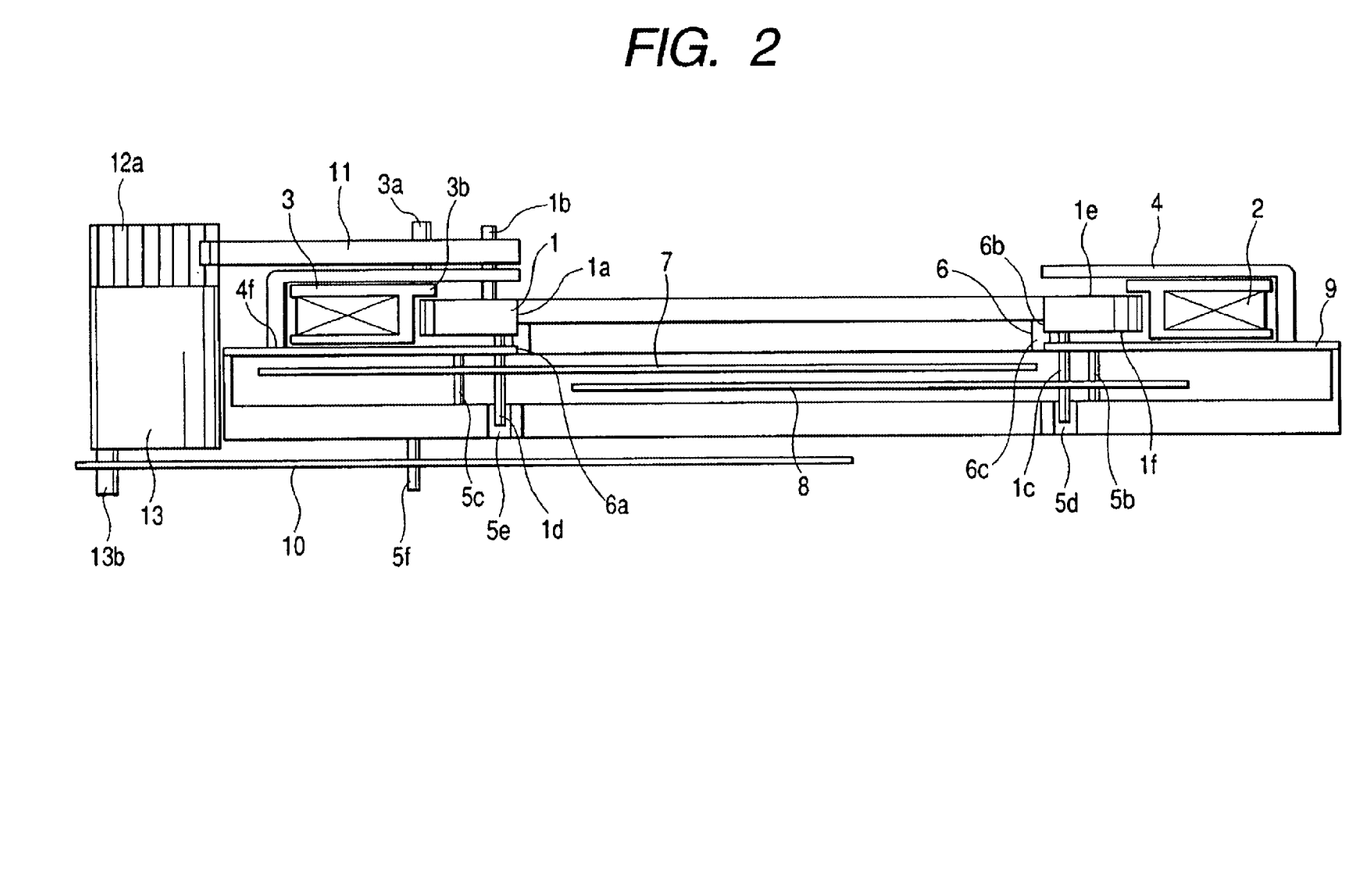
FIG. 2 is a sectional view of the shutter drive unit in its axial direction in the state of assembly completion that is shown in FIG. 1.
Figure 3:
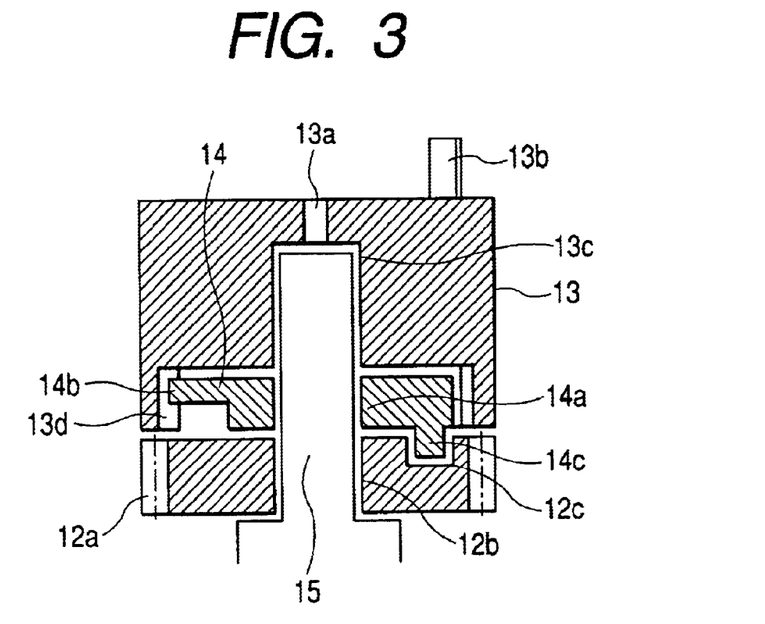
FIG. 3 is a sectional view of a one-way clutch.
Figure 4:
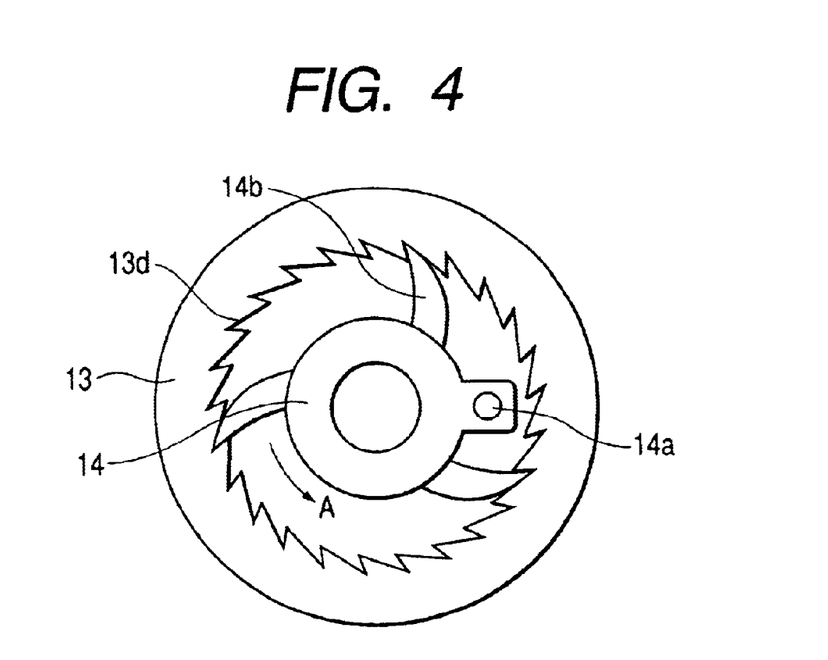
FIG. 4 is a plan of the one-way clutch shown in FIG. 3.
Figure 5A:
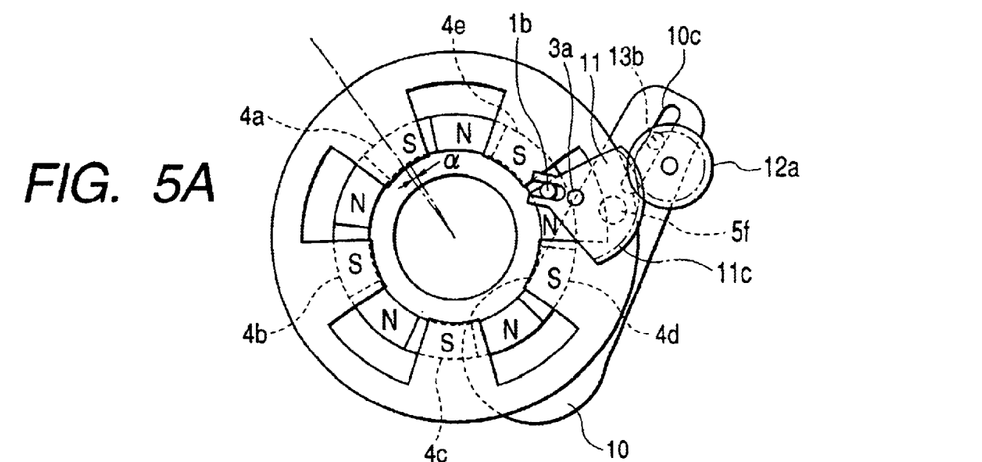
FIGS. 5A, 5B and 5C are drawings for explaining the rotation operation of a magnet of the shutter drive unit in FIG. 1.
Figure 5B:
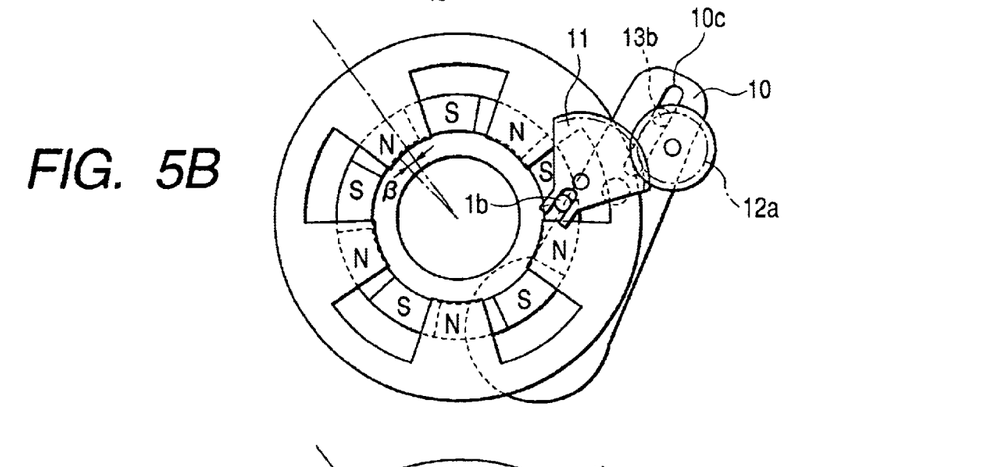
Figure 5C:
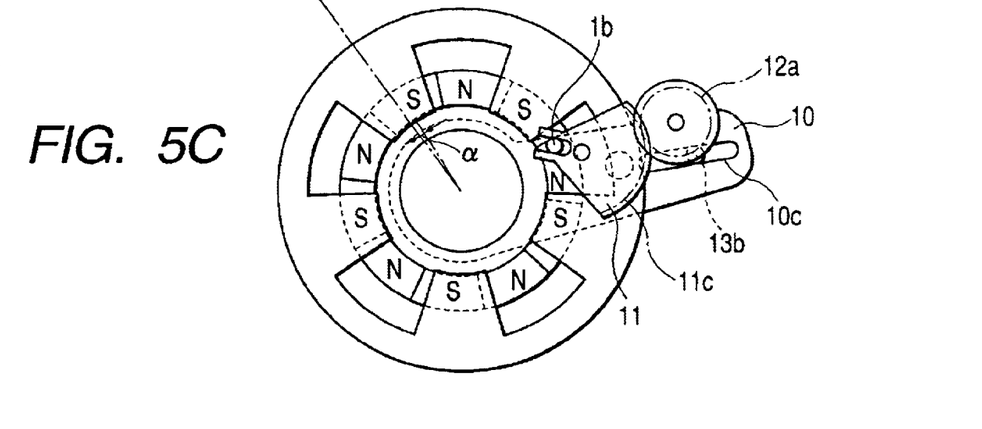

FIGS. 1 to 4 and FIGS. 5A to 5C show a shutter drive unit that is an embodiment according to a light amount adjusting apparatus of the present invention. FIG. 1 is an exploded perspective view of the shutter drive unit, FIG. 2 is a sectional view of the shutter drive unit in the direction of its rotation axis in the state of assembly completion, FIG. 3 is a sectional view of a one-way clutch described later, FIG. 4 is a plan view showing the relation between a ratchet member 14 and an output member 13 that is described later, and FIGS. 5A, 5B and 5C are drawings for explaining the rotational operation of a magnet of the shutter drive unit.

In FIGS. 1 to 4 and FIGS. 5A to 5C, a magnet 1 that is a rotor is formed in a hollow disk shape (ring shape) and is rotatably held while centering on a center of a circle, wherein at least a surface 1e perpendicular to the rotation axis (i.e., a plane in one direction of the disk) is divided into a plurality of pieces in the rotational (circumferential) direction to be alternately magnetized in different polarities. In this embodiment, as shown in FIGS. 5A to 5C, the surface 1e of the magnet 1 is divided into 10 pieces in the rotational direction while centering on the rotation axis, and S and N poles are alternately magnetized. A surface 1f opposite to the surface 1e of the magnet 1 is dividedly magnetized in a polarity opposite to the surface 1e, or, is not magnetized at all. Alternatively, it is no problem that the surface 1e of the magnet 1 is not magnetized and only the surface if is divided and magnetized. The magnet 1 is formed by injection-molding plastic magnet material. According to injection-molding, it is possible to easily form the short length of magnet 1 in the thickness direction, that is, the short length of magnet 1 in the axial direction of the disk-shaped magnet 1.

Dowels 1b, 1c and 1d that project in the direction parallel to the rotation axis are formed in the magnet 1, a central fitting portion 1a fits with a fitting portion 6b of a fitting ring 6 described later, and the magnet 1 is supported rotatably. Since the magnet 1 is formed by injection-molding a plastic magnet, production is easy even if the magnet 1 has a shape having the dowels 1b, 1c and 1d. In addition, since the fitting portion 1a is molded in one piece with the magnet 1, the axial accuracy of a magnet portion to a center of rotation improves.

In addition, since a thin resin film is formed on each surface of the injection-molded magnet, rust is greatly little generated in comparison with a compression magnet, and hence, rust proofing such as coating can be abolished. Furthermore, there is no adhesion of magnetic powder that becomes a problem in the compression magnet, and also no swelling of a surface that easily arises at the rust proofing coating.

The cylindrical coil 2 is wound around a bobbin 3 that is made of insulating material. The coil 2 is arranged outside the magnet 1 coaxially with the magnet 1, and an inner circumferential surface of the coil 2 is made to face an outer circumferential surface of the magnet 1. In addition, the thickness of the coil 2 in the direction of the rotation axis is made to be approximately the same as the thickness of the magnet 1 in the direction of the rotation axis (i.e., the thickness of the magnet 1). That is, the magnet 1 and coil 2 are constituted so that they may be arranged on the same plane perpendicular to the rotation axis, and may become the same position in the direction of the rotation axis.

A stator 4 is made of soft magnetic material, and has first magnetic pole portion members 4a, 4b, 4c, 4d and 4e excited by energizing the coil 2. These magnetic pole portion members 4a to 4e face the surface 1e of the disk-shaped magnet 1 while having a predetermined gap, and is constituted by comb-like teeth extending to the radial direction of the magnet 1. Then, by letting a magnetized division number of the magnet 1 be n, a number of these extending comb teeth is n/2 (five in this embodiment). All the magnetic pole portion members 4a to 4e are mutually excited in the same polarity by energizing the coil.

Here, let a magnetized division number of the surface 1e of the magnet 1 be n. The magnetic pole portion members 4a to 4e are formed by equally dividing a circumference by 720/n (72° in this embodiment). These magnetic pole portion members 4a to 4e are formed in a plate-like shape extending in parallel to the faced surface of the rotor. In this manner, by constituting the first magnetic pole portion, it becomes possible to further thin the thickness of the entire shutter drive unit. Supposing the magnetic pole portion is formed by concave and convex portions extending in parallel to the axial direction, the thickness of the stator increases only by the difference between the concave and convex portions. Nevertheless, by making the magnetic pole portion comb-shaped like this embodiment, it is possible to form the stator from which this differential thickness is omitted.

A blade pressure plate 9 described later is arranged in a position facing the magnetic pole portion members 4a to 4e while sandwiching the magnet 1, and forms a second magnetic pole portion to be excited by the coil 2 in the polarity opposite to the magnetic pole portion members 4a to 4e. The blade pressure plate 9 is made of soft magnetic material, and is magnetically connected to the stator 4 in a position different from the magnetic pole portion members 4a to 4e to constitute a magnetic circuit with the coil 2, and stator 4. In this embodiment, as shown in FIG. 2, the stator 4 is connected to the blade pressure plate 9 in a position 4f where an outside diameter of the coil 2 is covered.

The blade pressure plate 9 is constituted by a plane parallel to the surface 1f of the magnet 1, and faces the surface 1f with a predetermined gap. Though being constituted in a simply plate-like shape in this embodiment, the blade pressure plate 9 may be also constituted in a comb-like shape that has teeth the same number as that of the magnetic pole portion members 4a to 4e of the stator 4. However, when the blade pressure plate 9 is constituted in the comb-like shape, respective comb teeth of the blade pressure plate are made to face the comb teeth 4a to 4e of the stator 4. In this case, if the surface 1f of the magnet 1 is dividedly magnetized in the polarity opposite to the surface 1e, it is possible to further enlarge a rotation output of the rotor. If the blade pressure plate 9 is constituted in the simply plate-like shape like this embodiment, the magnetic flux that is generated by the coil 2 passes between the comb-like magnetic pole portion members 4a to 4e of the stator 4 and positions where the shapes of these magnetic pole portion members 4a to 4e are projected on a plane of the blade pressure plate 9. Hence, it is acceptable that the shape of the blade pressure plate 9 that is a second magnetic pole portion facing the magnetic pole portion members 4a to 4e of the stator 4 is merely tabular. In addition, it is also acceptable to constitute the second magnetic pole portion with another member (soft magnetic material) without making the blade pressure plate 9 serve as the second magnetic pole portion combinedly. In this case, since another member functions as the second magnetic pole portion, the blade pressure plate 9 need not be made of soft magnetic material. In this embodiment, since the blade pressure plate 9 doubles as the magnetic poles facing the magnetic pole portion members 4a to 4e of the stator 4, it is possible to constitute the shutter drive unit more thinly.

The coil 2 and bobbin 3 are fixed between the stator 4 and blade pressure plate 9 by bonding and the like. A rib 3b of the bobbin 3 is constituted so as to regulate a position of the surface 1e of the magnet 1, and secures a gap between the magnet 1 and magnetic pole portion members 4a to 4e of the stator 4 only by a predetermined quantity.

The magnetic pole members 4a to 4e of the stator 4 that are the first magnetic pole portion, and the magnetic pole of the blade pressure plate 9 that is the second magnetic pole portion are provided so as to sandwich the magnetization portion 1e of the magnet 1 while keeping a predetermined gap. Hence, the magnetic flux generated by energizing the coil 2 crosses the magnet 1 between the magnetic pole members 4a to 4e of the stator 4 and the magnetic pole of the blade pressure plate 9. Hence, the magnetic flux effectively acts on the magnet 1 that is the rotor, and improves an output of the rotor. Moreover, since it is possible to constitute the magnet 1 in the length in the direction of the rotation axis of the magnet 1, that is, in the thickness direction of the magnet 1 very thinly as described above, it is possible to quite lessen the gap between the magnetic pole portion members 4a to 4e of the stator 4 and the magnetic pole of the blade pressure plate 9. Therefore, it is possible to constitute the magneto-resistance of a magnetic circuit formed with the coil 2, stator 4, and blade pressure plate 9 in small size. Owing to this, since it is possible to make a lot of magnetic flux arise by a small current, it is possible to provide a motor achieving the improvement of a rotor output, reduction of power consumption, and miniaturization of the coil.

In the center of a base plate 5, an opening 5a is formed, dowels 5b and 5c projecting in the direction parallel to an optical axis are formed, and slots 5d and 5e with which the dowels 1c and 1d of the magnet 1 contact are formed. A rotatable angle of the magnet 1 is regulated by contacting the dowels 1c and 1d of the magnet 1 with the slots 5d and 5e. In addition, let this rotatable angle be θ°. In addition, the thickness of an outer circumferential edge portion of the base plate 5 is larger than that of other portions of the base plate 5 to form an outside wall.

A fitting ring 6 is fixed by fitting a portion 6a with a fitting hole 9a of the blade pressure plate 9. In the fitting ring 6, a surface 6b that is a sliding surfaces with the magnet 1 fits rotatably with an inner diameter portion 1a of the magnet 1, and the rib 6c regulates the position of the surface 1f of the magnet 1 to secure a gap between the blade pressure plate 9, which is the second magnetic pole portion, and the magnet 1 by predetermined distance.

In shutter blades 7 and 8, a round hole 7a provided in the shutter blade 7 fits with the dowel 5c of the base plate 5 rotatably, and the round hole 7b fits with the dowel 1d of the magnet 1 slidably. In addition, a round hole 8a provided in the shutter blade 8 fits with the dowel 5b of the base plate 5 rotatably, and a round hole 8b fits with the dowel 1c of the magnet 1 slidably.

A maximum opening 9a that regulates maximum aperture size is formed in the center of the shutter blade pressure plate 9. The predetermined distance of gap is formed between the shutter blade pressure plate 9 and base plate 5 by contacting an outer circumferential portion of the shutter blade pressure plate 9 with an outside wall of the base plate 5. In addition, the shutter blade 7 and shutter blade 8 are arranged in this gap. In addition, the shutter blade pressure plate 9 also serves as a supporting member that prevents the shutter blade 7 and shutter blade 8 from coming off axially.

When the coil 2 is energized and the magnet 1 rotates, the round hole 7b of the shutter blade 7 is pushed by the dowel 1c of the magnet 1, the shutter blade 7 rotates while centering on the round hole 7a, the round hole 8b of the shutter blade 8 is pushed by the dowel 1d of the magnet 1, and the shutter blade 8 rotates while centering on the round hole 8a. By rotating the magnet 1 within a rotatable angle, the shutter blades 7 and 8 move between a shading position where the maximum opening 9a of the shutter blade pressure plate 9 and the opening 5b of the base plate 5 are covered, and an exposure position where the passing of light is allowed. That is, while interlocking with the rotation of the magnet 1, the shutter blades 7 and 8 perform opening and closing drive. In addition, it is also possible to use these shutter bladed 7 and 8 as aperture blades by modifying their shapes.

In an ND filter plate 10, a hole portion 10a fits with the dowel 5f of the base plate 5 rotatably. An ND filter portion 10b with small optical transmittance moves between a position where an opening 9a of the shutter blade pressure plate 9 is covered, and a position where the ND filter portion evacuates from opening 9a by the rotation of the ND filter plate 10 to adjust the light amount passing the opening 9a.

In an interlock lever 11, a hole 11a fits with the dowel 3a of the bobbin 3 rotatably. A groove portion 11b fits with the dowel 1b of the magnet 1 slidably, and when the magnet 1 rotates, the interlock lever 11 rotates by an angle corresponding to the rotation of the magnet 1 while centering on the hole 11a.

In an input gear 12, a gear portion 12a engages with a gear portion 11c of the interlock lever 11, and a portion 12b fits rotatably with a pin from the base plate that is not shown. This input gear 12 constitutes a one-way clutch with an output member 13, and a ratchet member 14.

FIG. 3 is a sectional view of the one-way clutch, and FIG. 4 is a plan view showing the relation between the ratchet member 14 and output member 13.

In the output member 13 of the one-way clutch, a pin 13b fits with a slot 10c of the ND filter plate 10 slidably. According to the rotation of the output member 13, the ND filter 10 moves between a position where the opening 9a of the shutter blade pressure plate 9 is covered, and a position where the ND filter 10 evacuates from the opening 9a. The output member 13 is installed onto a pin 15 from the base plate, not shown, rotatably at a 13c portion as shown in FIG. 4, and a ratchet gear 13d is formed in its inner diameter portion.

A ratchet member 14 shown in FIG. 4 has a claw portion 14b that has an elasticity, and the claw portion 14b fits with a ratchet gear 13d of the output member 13. The ratchet member 14 rotatably fits with the pin 15 from the base plate, not shown, at a portion 14a. When the ratchet member 14 rotates in the direction shown by an arrow A in FIG. 4, the claw portion 14b is caught by the ratchet gear 13d for the output member 13 to rotate. However, when the ratchet member 14 rotates in the direction opposite to the direction shown by the arrow A, the claw portion 14b slides on the ratchet gear 13d by its bending, and hence the output member 13 never rotate. As shown in FIG. 3, in the ratchet member 14, a pin 14c is provided. Since this pin 14c fits with a hole 12c of an input gear 12, the ratchet member 14 and input gear 12 rotate always as one body.

In addition, the interlock lever 11 and input gear 12 are constituted so that the input gear 12 rotates by 180° when the magnet 1 rotates by θ°.

FIGS. 5A, 5B and 5C are drawings for explaining the rotation operation of a magnet of the shutter drive unit, and are drawings at the time of viewing the shutter drive unit from the upper side of the drawing shown in FIG. 2. FIGS. 5A and 5C show the state that the dowels 1c and 1d of the magnet 1 contact with edges of the slots 5d and 5e of the base plate 5 and the counterclockwise rotation of the magnet 1 is regulated. FIG. 5B shows the state that the dowels 1c and 1d of the magnet 1 contact with edges of the slots 5d and 5e of the base plate 5 and the clockwise rotation of the magnet 1 is regulated. The rotational position of the magnet 1 in FIGS. 5A and 5C is different from the rotational position of the magnet 1 in FIG. 5B by θ°.

When the coil 2 is not energized, the magnet 1 is held in any one of rotational positions in FIGS. 5A to 5C. This aspect will be explained by using FIGS. 5A to 5C, and FIG. 6.

Figure 6:
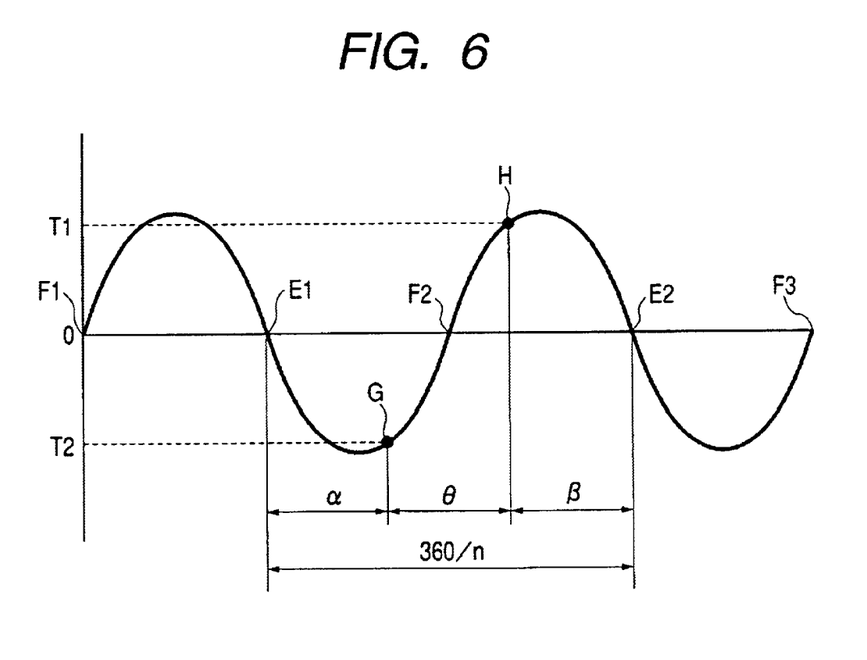
FIG. 6 is a graph showing an aspect of cogging torque.

FIG. 6 is a graph showing an aspect of cogging torque, and shows the relation between the rotational position of the magnet 1 and the attraction that the magnet 1 receives from the first magnetic pole portion members 4a to 4e in the state of not energizing the coil 2.

Specifically, the vertical axis denotes the magnetism generated between the magnet 1 and stator 4, and the horizontal axis does the rotation phase of the magnet 1. At points shown by an E1 point and an E2 point, when the magnet starts normal rotation, a counterrotating force is generated to return the magnet 1 to the former position. On the other hand, when starting reverse rotation, a normal rotating force is generated to return the magnet 1 to the former position. That is, in the magnet, a cogging force that tries to stably position the magnet at either of the E2 point or the E2 point is generated. In addition, when being located at either of phases at an F1 point, an F2 point, or an F3 point phase, the magnet 1 stops. However, when a phase shifts from these positions even a little, a force of rotating to the E1 point or the E2 point before or after the shifted position is generated. That is, it can be said that the F1 point, F2 point, and F3 point are stopping positions in unstable balance.

This embodiment has the structure that, when the coil 2 is not energized, the magnet 1 stably stops when a central portion of each pole of the magnet 1 is in the E1 point or the E2 point. However, by modifying shapes of the first magnetic pole portion members 4a to 4e, this embodiment can also have the structure that the magnet 1 stably stops when a boundary of poles of the magnet 1 is at the E1 point or the E2 point.

The central portion of a magnetic pole of the magnet 1 does not stop at either of the F1 point, F2 point, or F3 point since there arise vibration, a change of posture, etc. in the state of not energizing the coil 2, and hence, the magnet 1 stops at the E1 point or the E2 point with stability.

Stable points of the cogging like the E1 point and the E2 point exist at a cycle of 360/n while letting a magnetized division number of the magnet 1 be n, and their intermediate positions become unstable points like the F1 point, F2 point, and F3 point.

In this embodiment, the E1 point and the E2 point correspond to the centers of the first magnetic pole portion members 4a to 4e. That is, when the centers of the poles of the magnet 1 faces the centers of the first magnetic pole portion members 4a to 4e, the magnet 1 stably stops. However, even if the magnetic pole portion members 4a to 4e are excited from the state that the centers of the poles of the magnet 1 face the centers of the first magnetic pole portion members 4a to 4e by energizing the coil 2, a turning force is not generated in the magnet 1. Then this embodiment is set as shown in FIG. 5A so that the dowels 1c and 1d are made to contact with edges of the slots 5d and 5e, and when the coil 2 is not energized, an angle between the centers of the poles of the magnet 1 and the centers of the first magnetic pole portion members 4a to 4e may become $\alpha°$. Owing to this, when the magnetic pole portion members 4a to 4e are excited by energizing the coil 2 from the state shown in FIG. 5A, a turning force toward the E2 point from the E1 point, that is, the turning force in the clockwise direction is generated in the magnet 1. In addition, the state shown in FIG. 5A corresponds to a G point in FIG. 6. Cogging torque (attraction that is generated between the magnet 1 and stator 4 and acts on the magnet 1) in this position is T2, and a minus force returning the magnet to the E1 point (a counterclockwise force in FIGS. 5A to 5C) acts. That is, the holding power of the position where the dowels 1c and 1d of the magnet 1 contact with the slots 5d and 5e of the base plate 5 becomes T2. Therefore, the magnet 1 stably stops in the position shown in FIG. 5A by the holding power T2 at the time of not energizing the coil 2.

Similarly, in regard to the rotation of the magnet 1 in the clockwise direction of magnet 1, as shown in FIG. 5B, it is set that the dowels 1c and 1d are made to contact with edges of the slots 5d and 5e, and when the coil 2 is not energized, an angle between the centers of poles of the magnet 1 and the centers of the first magnetic pole portion members 4a to 4e becomes $\beta°$.

That is, the rotation of the magnet 1 is regulated by the slots 5d and 5e of the base plate 5 so that its rotation quantity may become smaller than the distance between the centers of S and N poles adjacent to each other in the magnet 1.

When the magnetic pole portion members 4a to 4e are excited by energizing the coil 2 from the state shown in FIG. 5A, a turning force toward the E1 point from the E2 point, that is, the turning force in the counterclockwise direction is generated in the magnet 1. In addition, the state shown in FIG. 5B corresponds to an H point in FIG. 6. Cogging torque in this position is T1, and a plus force advancing the magnet to the E2 point (a clockwise force in FIGS. 5A to 5C) acts. That is, the holding power of the position where the dowels 1c and 1d of the magnet 1 contact with the slots 5d and 5e of the base plate 5 becomes T1. Therefore, the magnet 1 stably stops in the position shown in FIG. 5B by the holding power T1 at the time of not energizing the coil 2. A turning angle of the magnet 1 from the state shown in FIG. 5A to the state shown in FIG. 5B is $\theta°$ mentioned above.

Next, the aspect of the rotary operation of the magnet 1 and ND filter plate 10 will be explained by using FIGS. 5A to 5C.

Suppose that the magnet 1 stably stops in the position shown in FIG. 5A when the coil 2 is not energized. At this time, the ND filter portion 10b is held by a pin 13b of the output member 13 in the position where the ND filter portion 10b evacuates from the opening 9a of the shutter blade pressure plate 9. This state is assumed to be a first exposure state.

When the coil 2 is energized from the state shown in FIG. 5A to excite the magnetic pole portion members 4a to 4e of the stator 4 into S poles, the magnet 1 receives an electromagnetic force in the rotary direction, and the magnet 1 that is the rotor starts rotation in the clockwise direction smoothly. Then, when the turning angle becomes $\theta°$ (i.e., the state shown in FIG. 5B), energizing of the coil 2 is shut off. Since the state shown in FIG. 5B corresponds to the H point in FIG. 6, the magnet 1 is stably held in this position by the cogging torque T1 as mentioned above.

Though the input gear 12 rotates in the clockwise direction in connection with the clockwise rotation of the magnet 1, the output member 13 does not rotate since the claw portion 14b of the ratchet member 14 that rotates as one body with the input gear 12 is bent and slides on the ratchet gear 13d as explained in FIGS. 3 and 4. Hence, the position of the pin 13b of the output member does not move, and the ND filter portion 10b keeps the position where the ND filter portion 10b evacuates from the opening 9a of the shutter blade pressure plate 9.

Here, when the coil 2 is energized in the direction opposite to the former direction to excite the magnetic pole portion members 4a to 4e of the stator 4 into N poles, the magnet 1 that is the rotor starts rotation in the counterclockwise direction smoothly. Then, when the turning angle becomes $\theta°$ (i.e., the state shown in FIG. 5C), energizing of the coil 2 is shut off. Since the state shown in FIG. 5C corresponds to the G point in FIG. 6 similarly to FIG. 5A, the magnet 1 is stably held in this position by the cogging torque T1 as mentioned above.

In FIGS. 5A and 5C, though the rotational position of the magnet 1 is the same, positions of the pin 13b of the output member 13 are different. Input gear 12 rotates by 180° (i.e., a half turn) in the counterclockwise direction when the magnet 1 rotates from the position, shown in FIG. 5B, in the counterclockwise direction by $\theta°$. The claw portion 14b of the ratchet member 14 rotating with the input gear 12 as one body engages with the ratchet gear 13d of the output member 13 to rotate the output member 13 by 180° in the counterclockwise direction. Therefore, the ND filter portion 10b rotates by the pin 13b of the output member to the position where the ND filter portion 10b covers the opening 9a of the shutter blade pressure plate 9. The light amount that passes the opening 9a in this state decreases in comparison with the state in FIG. 5A, and this state is made to be a second exposure state.

When the coil 2 is energized again to excite the magnetic pole portion members 4a to 4e of the stator 4 into S poles, the magnet 1 that is the rotor starts rotation in the clockwise direction. When the energizing of the coil 2 is reversed after the magnet 1 rotates at $\theta°$ to excite the magnetic pole portion members 4a to 4e of stator 4 into N poles and to rotate the magnet 1 in the counterclockwise direction again, the state returns to the first exposure state shown in FIG. 5A.

In this manner, the ND filter portion 10b moves by the movement of the magnet 1 in the counterclockwise direction between the position where the ND filter portion 10b evacuates from the opening 9a of the shutter blade pressure plate 9, and the position where the ND filter portion 10b covers the opening 9a. Owing to this, it is possible to switch the first exposure state and the second exposure state that are mentioned above.

In this manner, by switching the direction where the coil 2 is energized and rotating the magnet 1, it becomes possible to control positions of the shutter blade 7 and shutter blade 8 in the open position and the closed position. Hence, it is possible to control the quantity of light passing the opening 9a of the shutter blade pressure plate 9 and the opening 5b of the base plate 5. Moreover, at the time of not energizing the coil 2, each position is kept by the attraction between the magnet 1 and the magnetic pole portion members 4a to 4e. Therefore, even if the coil 2 is not energized, the positions of the shutter blade 7 and shutter blade 8 never change by vibration etc., and hence, it is possible to improve the reliability of the shutter and to save energy. Hence, this apparatus acts as a shutter apparatus that can be stably held even in the opening position or the closing position at the time of being not energized.

It is possible to perform two types of shuttering operations: an operation of making a state from the first exposure state that the ND filter portion 10b shown in FIG. 5A is in the position, where the ND filter portion 10b evacuates from the opening 9a of the shutter blade pressure plate 9, to a shuttering position where the maximum opening 9a of the blade pressure plate 9 and the opening 5b of the base plate 5 are covered with the shutter blade 7 and shutter blade 8 by exciting the magnetic pole portion members 4a to 4e of the stator 4 into S poles by energizing the coil 2 and rotating the magnet 1 in the clockwise direction at θ°; and an operation of making a state from the second exposure state, where the ND filter portion 10b shown in the FIG. 5C is in the position where the ND filter portion 10b covers the opening 9a of the shutter blade pressure plate 9, to a shuttering position where the maximum opening 9a of the blade pressure plate 9 and opening 5b of the base plate 5 are covered with the shutter blade 7 and shutter blade 8 by exciting the magnetic pole portion members 4a to 4e of the stator 4 into S poles by energizing the coil 2, and rotating the magnet 1 in the clockwise direction at θ°.

That is, it is possible to make it as a lens with two kinds of f-stop numbers as a taking lens. If an objective field is dark, it is possible to perform exposure from the first exposure state, and exposure can be also performed from the second exposure state when the objective field is bright.

In addition, it is possible that only one shutter drive unit drives them, and moreover, it is not necessary to keep energizing so as to keep a maximum aperture. Since the transmitted light amount is adjusted by putting the ND filter in and out, the diffraction phenomenon of light does not arise.

The size of the entire shutter drive unit in the direction of the rotation axis of the rotor is only the thickness of the disk-shaped magnet and the thickness of stator facing this magnet. Since the thickness of the stator itself is thin, it is possible to make the shutter drive unit microminiature so long as the magnet and the coil contained in the stator are made thin. Moreover, since it is sufficient to provide only one coil, an energization control circuit also becomes simple, and hence, it is possible to perform constitution in low cost.

In addition, by making the shape of the shutter drive unit be a doughnut, it becomes possible to arrange a lens therein, and to use a central portion of the shutter drive unit as an optical path.

Furthermore, the magnet 1 is made of a plastic magnet formed by injection-molding a mixture of Nd—Fe—B based rare earth magnetic powder and thermoplastic resin binder material such as polyamide. Owing to this, though the flexural strength of a compression-formed magnet is about 500 Kgf/cm$^2$, it is possible to obtain the flexural strength of 800 Kgf/cm$^2$ or more, when, for example, a polyamide resin is used as binder material. Hence, it becomes possible to form the magnet in a thin cylindrical shape that compression molding cannot make. The thin cylindrical formation makes it possible to set a gap between the magnetic pole portion of stator 4 and the magnetic poles of the blade suppression plate 9 to be short and to constitute a magnetic circuit having small magneto-resistance between those. Owing to this, since it is possible to generate a lot of magnetic flux even by a small magnetomotive force when energizing the coil 2, the performance of the actuator is enhanced.

Figure 7:
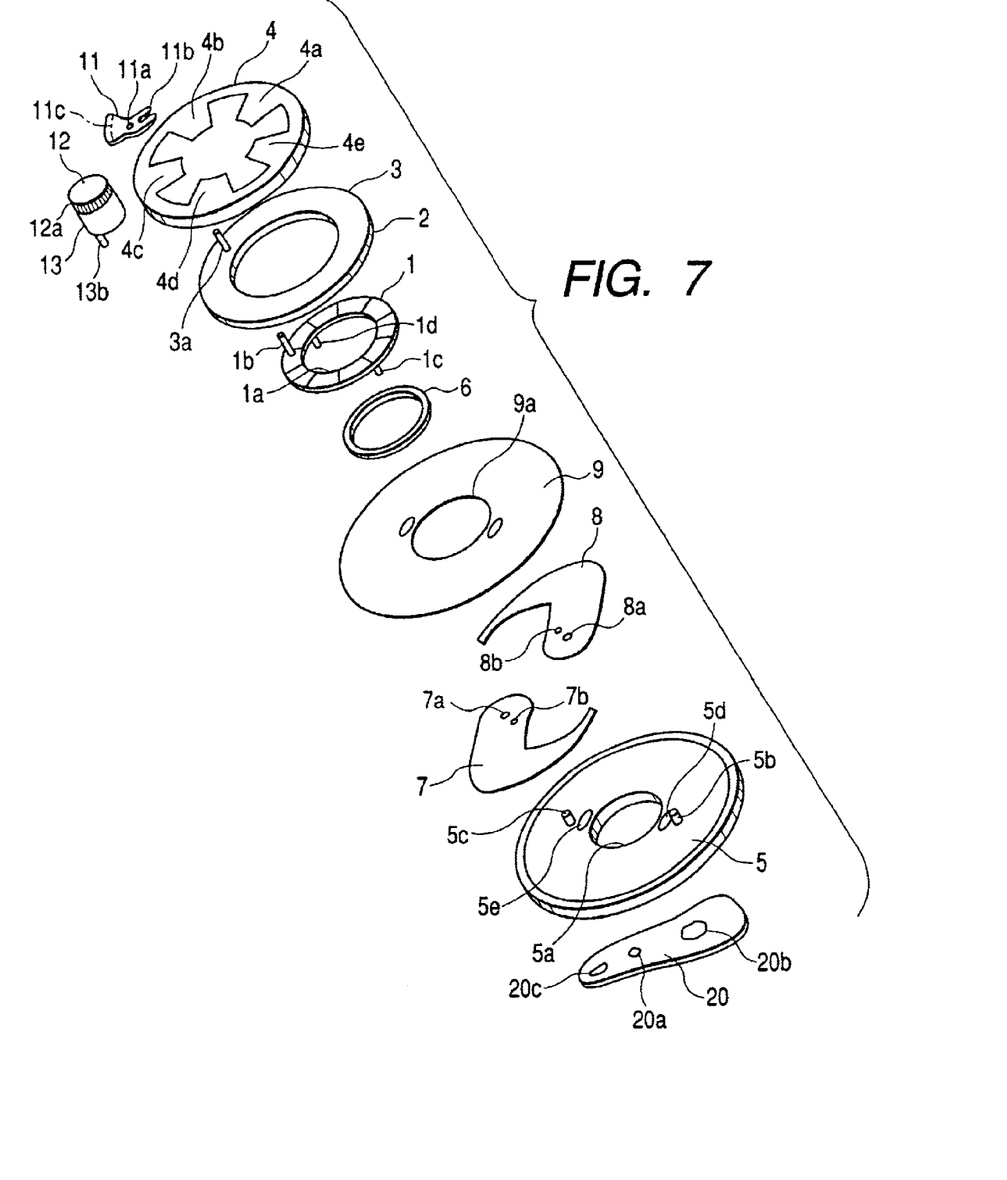
FIG. 7 is an exploded perspective view of a shutter drive unit in another embodiment.

FIG. 7 is a perspective view of a shutter drive unit in another embodiment. In the figure, instead of the ND filter plate 10 in the embodiment shown in FIGS. 1, 2 and 5A to 5C, a diaphragm aperture plate 20 that changes a diaphragm aperture is put in and out.

The dowel 5f of the base plate fits with a hole 20a of the diaphragm aperture plate rotatably, and a dowel 13b fits with a slot 20c of the diaphragm aperture plate 20 slidably. An opening 20b is an aperture formed less than that of an opening 9a of the shutter blade pressure plate 9, and is made of shading material excluding the opening 9a. The diaphragm aperture plate 20 goes into the opening 9a of the shutter blade pressure plate 9 according to the rotation of output member 13, and moves between a position where aperture diameter is lessened and a position where the diaphragm aperture plate 20 evacuates from the opening 9a to adjust the quantity of light passing the opening 9a.

Since the material of this diaphragm aperture plate 20 is plastic with shading capability, or metal, it is possible to constitute the diaphragm aperture plate 20 in the cost lower than that of the ND filter plate in the embodiment shown in FIGS. 1, 2 and 5A to 5C.

In addition, this embodiment adopts the structure that the input gear 12 rotates by 180° by the magnet rotating at θ°, and according to this, the pin 13b of the output member 13 moves between two rotational positions. However, for example, if the input gear 12 rotates by 120° by the magnet rotating at θ°, it is possible to have the structure that the pin 13b of the output member 13 moves between three rotational positions. Owing to this, it becomes possible to set three kinds of f-stop numbers, but the number of f-stop numbers that can be set doesn't limit this invention.

Figure 8:
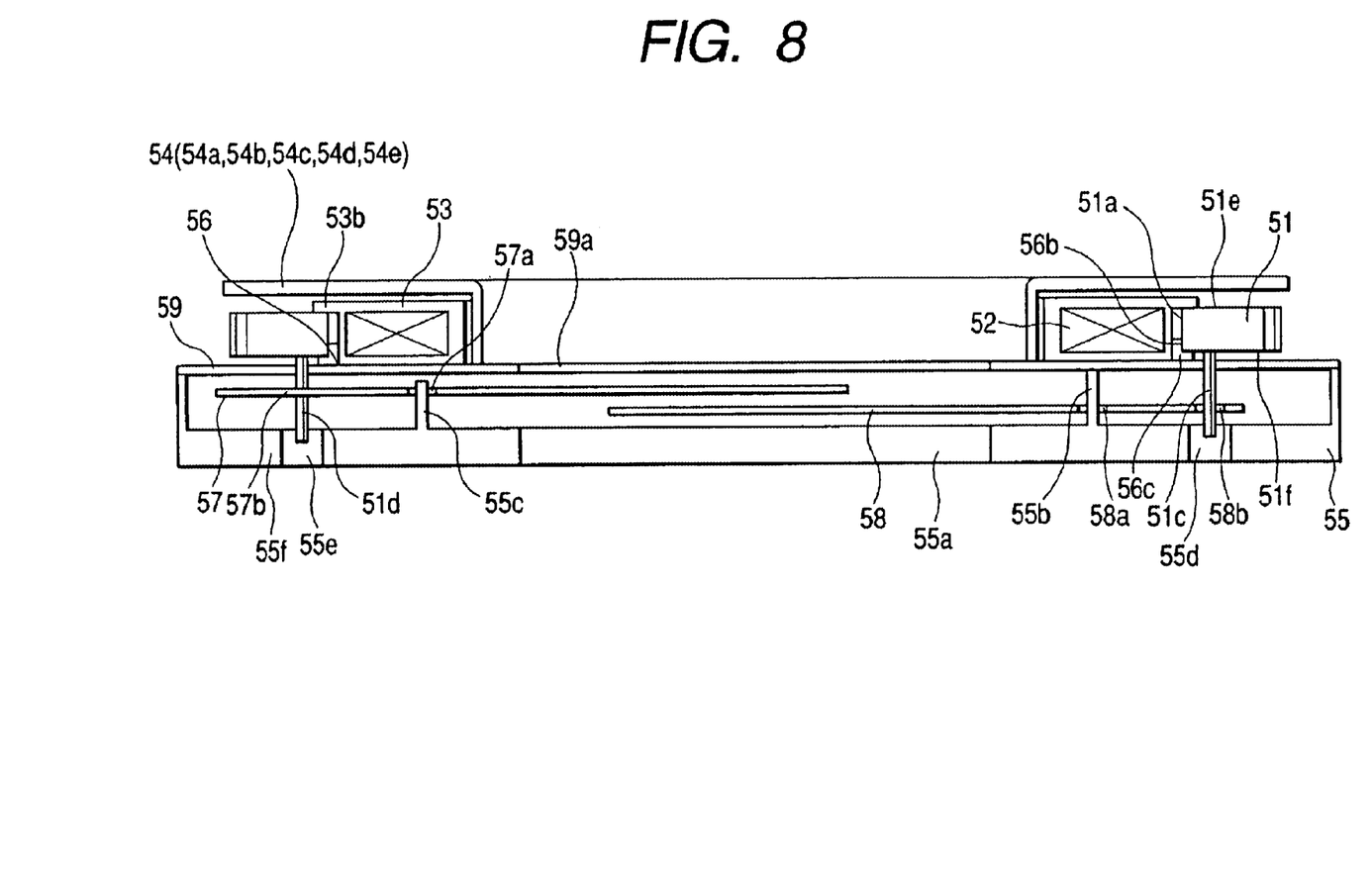
FIG. 8 is a sectional view of a shutter drive unit in its axial direction in the state of assembly completion in still another embodiment.

In this embodiment, though the coil is arranged outside the magnet, the coil can be also arranged inside the magnet. In this case also, the thickness of the coil 2 in the direction of the rotation axis is approximately equal to the thickness of the magnet 1 in the direction of the rotation axis (i.e., the thickness of the magnet 1). A section of the shutter drive unit at this time is shown in FIG. 8. Here, by focusing on the structure different from that of the embodiment shown in FIGS. 1, 2 and 5A to 5C, description will be performed.

In FIG. 8, a magnet 51 that is the rotor is formed into a hollow disk shape (ring shape), and is held rotatably by centering on a center of a circle. Furthermore, a surface 51e in the vertical direction at least to the rotation axis is divided in the rotational direction to be alternately magnetized into different polarities. Similarly to the magnet 1 in the embodiment shown in FIGS. 1, 2 and 5A to 5C, in this embodiment, the surface 51e of the magnet 51 is divided into 10 pieces in the rotational direction while centering on the rotation axis, and S and N poles are alternately magnetized. A surface 51f opposite to an opposite surface of the surface 51e of the magnet 51 is dividedly magnetized in a polarity opposite to the surface 51e, or, is not magnetized at all. Alternatively, it is no problem that the surface 51e of the magnet 51 is not magnetized and only the surface 51f is divided and magnetized. The magnet 51 is formed by injection-molding plastic magnet material. In addition, dowels 51b, 51c, and 51d that project in the direction parallel to the rotation axis, and a fitting portion 51a in a central portion are formed in the magnet 51, the central fitting portion 51a fits with a fitting portion 56b of a fitting ring 56 described later, and the magnet 51 is supported rotatably.

The cylindrical coil 52 is wound around a bobbin 53 that consists of insulating material. The coil 52 is arranged inside the magnet 51, and an outer circumferential surface of the coil 52 is made to face an inner circumferential surface of the magnet 51. In addition, the thickness of the coil 52 in the direction of the rotation axis is made to be approximately the same as the thickness in the direction of the rotation axis of the magnet 51 (i.e., the thickness of the magnet 51).

A stator 54 is made of soft magnetic material, and has first magnetic pole portion members 54a, 54b, 54c, 54d and 54e excited by energizing the coil 52 similarly to the embodiment shown in FIGS. 1, 2 and 5A to 5C. These magnetic pole portion members 54a to 54e face the surface 51e of the disk-shaped magnet 51 while having a predetermined gap, and is constituted by comb-like teeth extending to the radial direction of the magnet 51. Then, let a magnetized division number of the magnet 1 be n, a number of these extending comb teeth is n/2 (five in this embodiment). All the magnetic pole portion members 54a to 54e are mutually excited in the same polarity by energizing the coil.

The magnetic pole portion members 54a to 54e are formed by equally dividing a circumference by 720/n (72° in this embodiment). These magnetic pole portion members 54a to 54e are formed in a plate-like shape extending in parallel to the faced surface of the rotor.

A blade pressure plate 59 is arranged in a position facing the magnetic pole portion members 54a to 54e with sandwiching the magnet 51, and forms a second magnetic pole portion to be excited by the coil 52 in the polarity opposite to the magnetic pole portion members 54a to 54e. The blade pressure plate 59 is made of soft magnetic material, and is magnetically connected to the stator 4 in a position different from the magnetic pole portion members 54a to 54e to constitute a magnetic circuit with the coil 52, and stator 54. In this embodiment, as shown in FIG. 8, the stator 54 is connected to the blade pressure plate 59 in a position (inside an inner circumference of the coil) where an inner diameter of the coil 2 is covered.

The blade pressure plate 59 is parallel to the surface 51f opposite to the surface 51e of the magnet 51, and faces the surface 51f with a predetermined gap. Though being constituted in a simply plate-like shape, the blade pressure plate 59 may be also constituted in a comb-like shape that has the same number of teeth as that of the magnetic pole portion members 54a to 54e of the stator 54. However, when the blade pressure plate 59 is constituted in the comb-like shape, respective comb teeth of the blade pressure plate are made to face the comb teeth 54a to 54e of the stator 54. In this case, if the surface 51f of the magnet 51 is dividedly magnetized in the polarity opposite to the surface 51e, it is possible to further enlarge a rotation output of the rotor.

The coil 52 and bobbin 53 are fixed between the stator 54 and blade pressure plate 59 by bonding and the like. A rib 53b of the bobbin 53 is constituted so as to regulate a position of the surface 51e of the magnet 51, and secures a gap between the magnet 51 and magnetic pole portion members 54a to 54e of the stator 54 only by predetermined quantity.

The magnetic pole members 54a to 54e of the stator 54 that are the first magnetic pole portion, and the magnetic pole of the blade pressure plate 59 that is the second magnetic pole portion are provided so as to sandwich the magnetization portion 51e of the magnet 51 while keeping a predetermined gap. Hence, the magnetic flux generated by energizing the coil 52 crosses the magnet 51 between the magnetic pole members 54a to 54e of the stator 54 and the magnetic pole of the blade pressure plate 59. Owing to this, since it is possible to make a lot of magnetic flux arise by a small current, it is possible to provide a motor achieving the improvement of a rotor output, reduction of power consumption, and miniaturization of the coil.

In a base plate 55, an opening 55a is formed, dowels 55b and 55c projecting in the direction parallel to an optical axis are formed as one body, and slots 55d and 55e with which the dowels 51c and 51d of the magnet 51 contact are formed. A rotatable angle of the magnet 51 is regulated by contacting the dowels 51c and 51d of the magnet 51 with the slots 55d and 55e. In addition, let this rotatable angle be θ°. Furthermore, the thickness of an outer circumferential edge portion of the base plate 55 is larger than that of other portions of the base plate 55 to form an outside wall.

A fitting ring 56 is fixed by fitting a portion 56a with a fitting hole 59a of the blade pressure plate 59. In the fitting ring 56, a face 56b that is a sliding surface with the magnet 51 fits rotatably with an inner diameter portion 51a of the magnet 51, and the rib 56c regulates the position of the surface 51f of the magnet 51 to secure a gap between the blade pressure plate 59, which is the second magnetic pole portion, and the magnet 51 by predetermined distance.

In shutter blades 57 and 58, a round hole 57a provided in the shutter blade 57 fits with the dowel 55c of the base plate 55 rotatably, and the round hole 57b fits with the dowel 51d of the magnet 51 slidably. In addition, a round hole 58a provided in the shutter blade 58 fits with the dowel 55b of the base plate 55 rotatably, and a round hole 58b fits with the dowel 51c of the magnet 51 slidably.

A maximum opening 59a that regulates maximum aperture size is formed in the center of the shutter blade pressure plate 59. The predetermined distance of gap is formed between the shutter blade pressure plate 59 and base plate 55 by contacting an outer circumferential portion of the shutter blade pressure plate 59 with an outside wall of the base plate 55. In addition, the shutter blade 57 and shutter blade 58 are arranged in this gap. Furthermore, the shutter blade pressure plate 59 also serves as a supporting member that prevents the shutter blade 57 and shutter blade 58 from coming off axially.

When the coil 52 is energized and the magnet 51 rotates, the round hole 57b of the shutter blade 57 is pushed by the dowel 51c of the magnet 51, the shutter blade 57 rotates while centering on the round hole 57a, the round hole 58b of the shutter blade 58 is pushed by the dowel 51d of the magnet 51, and the shutter blade 58 rotates while centering on the round hole 58a. By rotating the magnet 51 within a rotatable angle, the shutter blades 57 and 58 move between a shading position where the maximum opening 59a of the shutter blade pressure plate 59 and the opening 55a of the base plate 55 are covered, and an exposure position where the passing of light therethrough is allowed. That is, while interlocking with the rotation of the magnet 51, the shutter blades 57 and 58 perform opening and closing drive. In addition, it is also possible to use these shutter bladed 57 and 58 as aperture blades by modifying their shapes.

Moreover, the magnet has a hollow disk shape in the above-mentioned embodiment since it is used as the shutter drive unit, but it is no care that the magnet has a mere disk shape when using it as only an ultra flat motor. However, it is needless to say that, since it is not possible to arrange the coil so as to face inner circumference of the magnet like the embodiment shown in FIG. 8 because the magnet is not a hollow shape, it is necessary to arrange the coil so as to face the outer circumference of the magnet like the embodiment shown in FIGS. 1, 2 and 5A to 5C.

In addition, it is possible to drive the shutter blade similarly to the above-mentioned embodiment even in the structure that one set of N pole and S pole is provided in a magnet and only a first magnetic pole is provided in a stator though rotating torque drops. In this case, since it is sufficient just to arrange only two magnetic poles in the circumference of the magnet, it is possible to freely set θ° that is a rotatable angle of the magnet.

What is claimed is:

1. A motor comprising:
    a hollow, disk-shaped rotor having at least one surface magnetized in a plurality of different poles in a rotational direction thereof;
    a coil arranged coaxial with the rotor such that an inner circumferential surface of the coil faces an outer circumferential surface of the rotor, or an outer circumferential surface of the coil faces an inner circumferential surface of the rotor;
    a first magnetic pole portion that faces one surface of the rotor, is formed with teeth extending in a radial direction of the rotor, and can be excited by the coil; and
    a second magnetic pole portion that can be excited by the coil, and is provided on a side of the rotor opposite the first magnetic pole portion such that the first and second magnetic pole portions sandwich the rotor.

2. The motor according to claim 1, wherein the first magnetic pole portion has a plate-like shape extending parallel to the surface of the rotor facing the first magnetic pole portion.

3. A motor comprising:
    a disk-shaped rotor having at least one surface magnetized in a plurality of different poles in a rotational direction thereof;
    a coil arranged coaxial with the rotor such that an inner circumferential surface of the coil faces an outer circumferential surface of the rotor;
    a first magnetic pole portion that faces one surface of the rotor, is formed with teeth extending in a radial direction of the rotor, and can be excited by the coil; and
    a second magnetic pole portion that can be excited by the coil, and is provided on a side of the rotor opposite the first magnetic pole portion such that the first and second magnetic pole portions sandwich the rotor.

4. The motor according to claim 3, wherein the first magnetic pole portion has a plate-like shape extending parallel to the surface of the rotor facing the first magnetic pole portion.

5. A light amount adjusting apparatus comprising:
    a hollow, disk-shaped rotor having at least one surface magnetized in a plurality of different poles in a rotational direction thereof;
    a coil arranged coaxial with the rotor such that an inner circumferential surface of the coil faces an outer circumferential surface of the rotor, or an outer circumferential surface of the coil faces an inner circumferential surface of the rotor;
    a first magnetic pole portion that faces one surface of the rotor, is formed with teeth extending in the radial direction of the rotor, and can be excited by the coil;
    a second magnetic pole portion that can be excited by the coil, and is provided on a side of the rotor opposite the first magnetic pole portion such that the first and second magnetic pole portions sandwich the rotor;
    a base plate member that has an opening therethrough; and
    a blade member that moves across the opening in interlocking relation with rotation of the rotor.

6. The light amount adjusting apparatus according to claim 5, wherein the blade member is a shutter blade or an aperture blade.

7. The light amount adjusting apparatus according to claim 5, further comprising:
    a regulator that drives a lever member by rotation of the rotor, and regulates a quantity of light that passes through the opening of the base plate member via an opening provided in the lever member.

8. The light amount adjusting apparatus according to claim 7,
    wherein the regulator comprises a gear member that drives the lever member while rotating with the rotor; and
    wherein the gear member drives the lever member only when the rotor rotates in a predetermined direction.

9. The light amount adjusting apparatus according to claim 5, further comprising:
    a regulator that drives a lever member by rotation of the rotor, and regulates a quantity of light that passes through an opening of the base plate member via a filter portion provided in the lever member.

10. The light amount adjusting apparatus according to claim 9,
    wherein the regulator comprises a gear member that drives the lever member while rotating with the rotor; and
    wherein the gear member drives the lever member only when the rotor rotates in a predetermined direction.

11. The light amount adjusting apparatus according to claim 5,
    wherein rotation of the rotor is regulated so that an amount of rotation of the rotor may become smaller than a distance between centers of two adjacent poles of the rotor.

12. A light amount adjusting apparatus comprising:
    a hollow, disk-shaped rotor having at least one surface magnetized in a plurality of different poles in a rotational direction thereof;
    a coil arranged such that an inner circumferential surface of the coil faces an outer circumferential surface of the rotor, or an outer circumferential surface of the coil faces an inner circumferential surface of the rotor;
    a first magnetic pole portion that faces one surface of the rotor, is formed with teeth extending in the radial direction of the rotor, and can be excited by the coil;
    a second magnetic pole portion that can be excited by the coil, and is provided on a side of the rotor opposite the first magnetic pole portion such that the first and second magnetic pole portions sandwich the rotor;
    a base plate member having an opening therethrough;
    a blade member that moves across the opening in interlocking relation with rotation of the rotor; and
    a regulator that drives a lever member by rotation of the rotor, and regulates a quantity of light that passes through the opening of the base plate member via an opening provided in the lever member,
    wherein the regulator comprises a gear member that drives the lever member while rotating with the rotor; and
    wherein the gear member drives the lever member only when the rotor rotates in a predetermined direction.

13. A light amount adjusting apparatus comprising:
- a hollow, disk-shaped rotor having at least one surface magnetized in a plurality of different poles in a rotational direction thereof;
- a coil arranged such that an inner circumferential surface of the coil faces an outer circumferential surface of the rotor, or an outer circumferential surface of the coil faces an inner circumferential surface of the rotor;
- a first magnetic pole portion that faces one surface of the rotor, is formed with teeth extending in the radial direction of the rotor, and can be excited by the coil;
- a second magnetic pole portion that can be excited by the coil, and is provided on a side of the rotor opposite the first magnetic pole portion such that the first and second magnetic pole portions sandwich the rotor;
- a base plate member having an opening therethrough;
- a blade member that moves across the opening of the base plate in interlocking relation with rotation of the rotor; and
- a regulator that drives a lever member by rotation of the rotor, and regulates a quantity of light that passes through the opening of the base plate member via a filter portion provided in the lever member.

14. The light amount adjusting apparatus according to claim 13,
- wherein the regulator comprises a gear member that drives the lever member while rotating with the rotor; and
- wherein the gear member drives the lever member only when the rotor rotates in a predetermined direction.

15. A light amount adjusting apparatus comprising:
- a hollow, disk-shaped rotor having at least one surface magnetized in a plurality of different poles in a rotational direction thereof;
- a coil arranged such that an inner circumferential surface of the coil faces an outer circumferential surface of the rotor, or an outer circumferential surface of the coil faces an inner circumferential surface of the rotor;
- a first magnetic pole portion that faces one surface of the rotor, is formed with teeth extending in the radial direction of the rotor, and can be excited by the coil;
- a second magnetic pole portion that can be excited by the coil, and is provided on a side of the rotor opposite the first magnetic pole portion such that the first and second magnetic pole portions sandwich the rotor,
- a base plate member having an opening therethrough; and
- a blade member that moves across the opening in interlocking relation with rotation of the rotor,
- wherein rotation of the rotor is regulated so that an amount of rotation of the rotor may become smaller than a distance between centers of two adjacent poles of the rotor.

* * * * *

UNITED STATES PATENT AND TRADEMARK OFFICE
CERTIFICATE OF CORRECTION

PATENT NO. : 6,858,959 B2  
DATED : February 22, 2005  
INVENTOR(S) : Chikara Aoshima Page 1 of 1

It is certified that error appears in the above-identified patent and that said Letters Patent is hereby corrected as shown below:

Title page,
Item [56], References Cited, FOREIGN PATENT DOCUMENTS,
"01315248" and "2000092810" should read -- 01-315248 -- and -- 2000-92810 --, respectively.

Column 4,
Line 33, "if" should read -- 1f --.
Line 52, "rust is greatly little" should read -- minimal rust is --.

Column 5,
Line 8, "is" should read -- are --.

Column 6,
Line 60, "id" should read -- 1d --.

Column 8,
Line 38, "E2 point" (first occurrence) should read -- E1 point --.

Column 14,
Line 60, "bladed" should read -- blades --.
Line 64, "it is no care that" should be deleted and "has" should read -- may have --.

Column 15,
Lines 17 and 56, "coaxial" should read -- coaxially --.

Signed and Sealed this

Twelfth Day of July, 2005

JON W. DUDAS  
*Director of the United States Patent and Trademark Office*